United States Patent
Numabe

(10) Patent No.: US 10,557,542 B2
(45) Date of Patent: Feb. 11, 2020

(54) FINAL DRIVE

(71) Applicant: GKN Driveline Japan Ltd, Tochigi (JP)

(72) Inventor: Shungo Numabe, Tochigi (JP)

(73) Assignee: GKN Driveline Japan Ltd., Tochigi (JP)

( * ) Notice: Subject to any disclaimer, the term of this patent is extended or adjusted under 35 U.S.C. 154(b) by 137 days.

(21) Appl. No.: 15/818,784

(22) Filed: Nov. 21, 2017

(65) Prior Publication Data

US 2018/0087640 A1 Mar. 29, 2018

Related U.S. Application Data

(63) Continuation of application No. PCT/JP2015/078271, filed on Oct. 6, 2015.

(51) Int. Cl.
*F16H 57/04* (2010.01)
*F16H 48/22* (2006.01)
(Continued)

(52) U.S. Cl.
CPC ....... *F16H 57/0424* (2013.01); *B60K 17/165* (2013.01); *F16H 48/22* (2013.01);
(Continued)

(58) Field of Classification Search
CPC .. F16H 48/34; F16H 57/0424; F16H 57/0427; F16H 57/0421; F16H 57/0483;
(Continued)

(56) References Cited

U.S. PATENT DOCUMENTS 5,279,401 A 1/1994 Stall
6,659,250 B2 12/2003 Nestler et al.
(Continued)

FOREIGN PATENT DOCUMENTS

CN 103358900 A 10/2013
DE 10312349 B3 * 12/2004 ............. F16H 48/22
(Continued)

OTHER PUBLICATIONS

International Search Report and Written Opinion for PCT/JP2015/078271 dated Dec. 15, 2015 (9 pages; with English translation).
(Continued)

*Primary Examiner* — Jacob S. Scott
*Assistant Examiner* — James J Taylor, II
(74) *Attorney, Agent, or Firm* — Bejin Bieneman PLC

(57) ABSTRACT

A final drive mounted on a vehicle is comprised of: a differential gear set; a clutch rotatable about a rotational axis and combined with the differential gear set; a cam mechanism comprising a cam plate fixed from rotation about the rotational axis and so disposed as to move along the rotational axis to exert a fastening force on the clutch and a cam gear rotatable about the rotational axis, the cam mechanism for converting rotation of the cam gear into a pressure force on the cam plate; a gear set so meshed with the cam gear to rotate the cam gear; a casing housing the differential gear set, the clutch, the cam mechanism and the gear set in a single chamber; and a motor so disposed outside and above the casing as to hide behind the casing from a road and combined with the gear set.

5 Claims, 5 Drawing Sheets

(51) Int. Cl.
*B60K 17/16* (2006.01)
*F16H 57/037* (2012.01)
*F16H 48/40* (2012.01)
*F16D 13/52* (2006.01)
*F16D 23/12* (2006.01)
*F16H 48/08* (2006.01)
*F16H 48/34* (2012.01)

(52) U.S. Cl.
CPC ....... *F16H 57/037* (2013.01); *F16H 57/0427* (2013.01); *F16H 57/0457* (2013.01); *F16H 57/0483* (2013.01); *F16D 13/52* (2013.01); *F16D 2023/123* (2013.01); *F16H 48/08* (2013.01); *F16H 48/40* (2013.01); *F16H 2048/343* (2013.01)

(58) Field of Classification Search
CPC .... F16H 57/0457; F16H 57/037; F16H 48/22; F16H 2048/343; F16H 2057/02034; F16H 48/08; B60K 17/165; B60K 17/02; B60K 17/20; F16D 13/52; F16D 23/12; F16D 2023/123
See application file for complete search history.

(56) References Cited

U.S. PATENT DOCUMENTS

| | | | | |
|---|---|---|---|---|
| 7,001,303 | B1 * | 2/2006 | Peura | ............... F16H 48/08 475/234 |
| 8,771,128 | B2 * | 7/2014 | Ekonen | ............... B60K 17/344 180/244 |
| 2002/0088683 | A1 | 7/2002 | Nestler | |

FOREIGN PATENT DOCUMENTS

| | | | | |
|---|---|---|---|---|
| EP | 1854654 | A1 * | 11/2007 | ............. B60K 17/35 |
| JP | H02173424 | A | 7/1990 | |
| JP | H03037468 | A | 2/1991 | |
| JP | 2002262511 | A | 9/2002 | |
| JP | 2012035757 | A | 2/2012 | |
| JP | 2013164098 | A | 8/2013 | |

OTHER PUBLICATIONS

Official Action dated Aug. 1, 2019 in Chinese Patent Application No. 201580080706.6 (6 pages).

* cited by examiner

FINAL DRIVE

CROSS-REFERENCE TO RELATED APPLICATIONS

This application is a continuation application of, and claims priority to, Patent Cooperation Treaty Application No. PCT/JP2015/078271, filed on Oct. 6, 2015, which application is hereby incorporated herein by reference in its entirety.

BACKGROUND

As is well known, in a vehicle of a front-engine rear-wheel-drive (FR) type, torque generated by an engine and/or a motor is transmitted through a transmission and a propeller shaft to a final drive. The final drive contains a differential gear set and thereby distributes the torque to the right and left driving wheels.

The final drive may further contain a clutch for limiting differential motion of the differential gear set and an electric motor is often used to operate this. As an ordinary electric motor is somewhat powerless to drive the clutch, the motor is usually used in combination with reduction gears. The patent literatures indicated below are relevant background.

Japanese Patent Application Laid-open No. H02-173424 ("PTL1").

Japanese Patent Application Laid-open No. 2002-262511 ("PTL2").

Where to place the electric motor in the final drive is an important factor in durability. As the final drive is mounted under the vehicle's body, as being opposed to the road, it is steadily exposed to incoming stones, dirt or water. The electric motor is vulnerable to bad influences thereby.

As the art disclosed in the PTL 1 allows arrangement of the electric motor and the reduction gears above the casing, these elements are unlikely to suffer bad influences by the incoming stones, dirt and water. In this case, however, as the lubricant oil within the casing cannot sufficiently reach the reduction gears, an independent lubrication system separate from the one within the casing is required. Specifically, the art disclosed in PTL 1 requires that the reduction gears should be incorporated in a casing separated from the final drive and a lubricant such as grease should be filled therein. Further, particular attention should be necessary to adjust a shaft in position because the shaft drawn out of the casing for the reduction gears and intruding into the casing for the final drive bears transmission of the driving force. Fixation between these casings may give rise to any issue and such an arrangement may raise another issue that dusts intrude therein through a coupling therebetween. Its durability is not always sufficient.

In a case where the electric motor is disposed below the casing as with the art disclosed in the PTL 2, the lubricant oil within the casing can be supplied to the reduction gears. However, of course, the electric motor is then exposed to the incoming stones, dust and water from the road.

SUMMARY

The present disclosure relates to a final drive for distributing torque to driving wheels, and in particular to a final drive comprising an electric motor and yet being resistive to incoming stones, dirt or water from the road.

The present disclosure addresses the above problems. According to an aspect, a final drive mounted on a vehicle and opposed to a road, the final drive being of use to transmit torque from a propeller shaft to a pair of axles, is comprised of: a differential gear set so structured as to distribute the torque from the propeller shaft to the pair of axles; a clutch rotatable about a rotational axis and combined with the differential gear set; a cam mechanism comprising a cam plate fixed from rotation about the rotational axis and so disposed as to move along the rotational axis to exert a fastening force on the clutch and a cam gear rotatable about the rotational axis, the cam mechanism for converting rotation of the cam gear into a pressure force along the rotational axis of the cam plate; a gear set so meshed with the cam gear to rotate the cam gear; a casing defining a single chamber and housing the differential gear set, the clutch, the cam mechanism and the gear set in the single chamber; and a motor so disposed outside and above the casing as to hide behind the casing from the road and combined with the gear set to drive the gear set.

DETAILED DESCRIPTION

Exemplary embodiments will be described hereinafter with reference to FIGS. 1 through 5. In these drawings, the reference sign F depicts the direction toward the vehicle's front, A depicts the direction toward the rear, and U, D, R and L respectively depict the directions toward the top, the bottom, the right and the left.

Throughout the following description and the appended claims, a rotational axis means a rotational axis common to axles, a differential gear set, and a clutch, unless described otherwise. Further, while the front and the rear, or the right and the left, are often discriminated, this is merely for the convenience of explanation and therefore does not limit embodiments.

Figure 1:
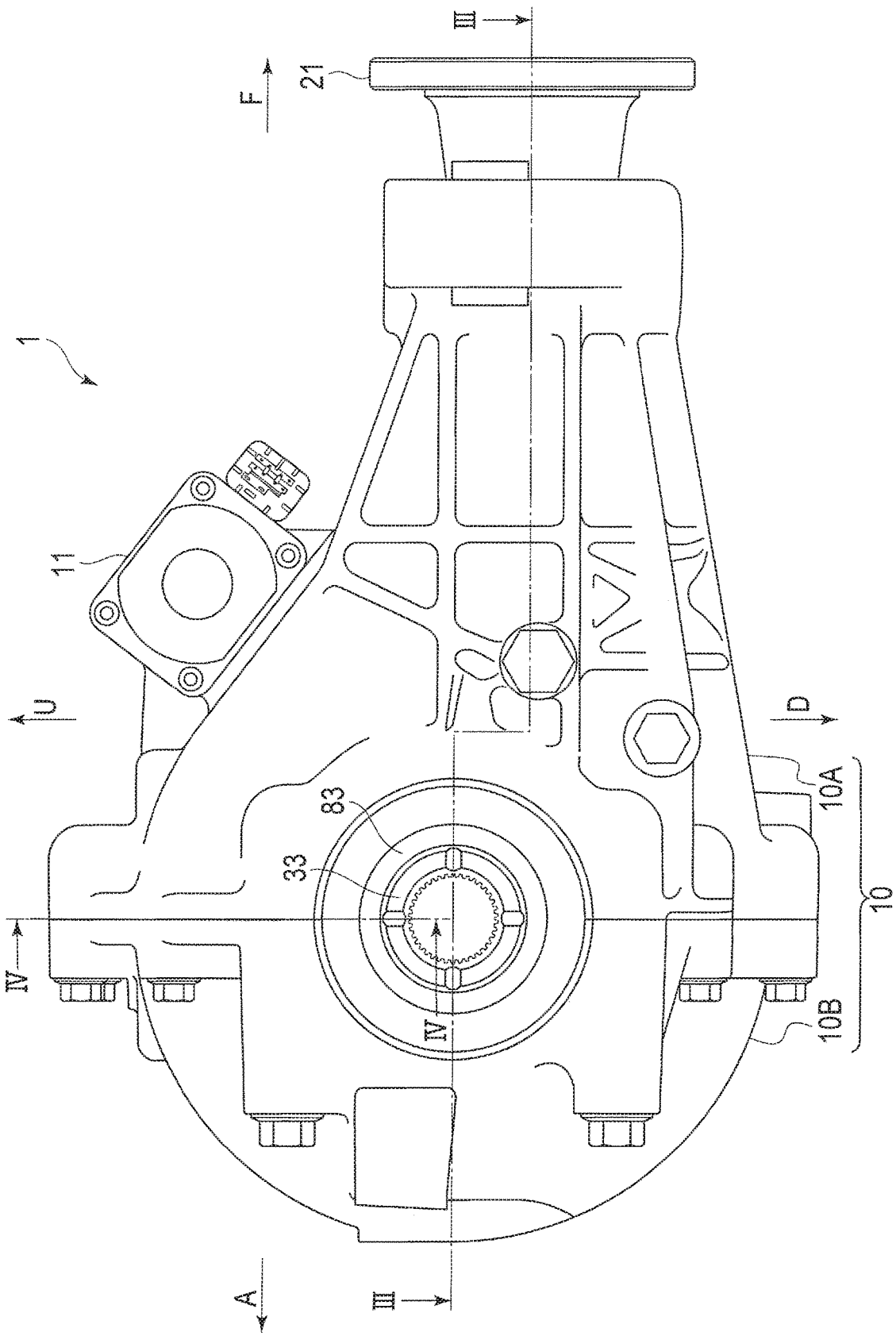
FIG. 1 is a side view of a final drive according to an embodiment.
Figure 2:
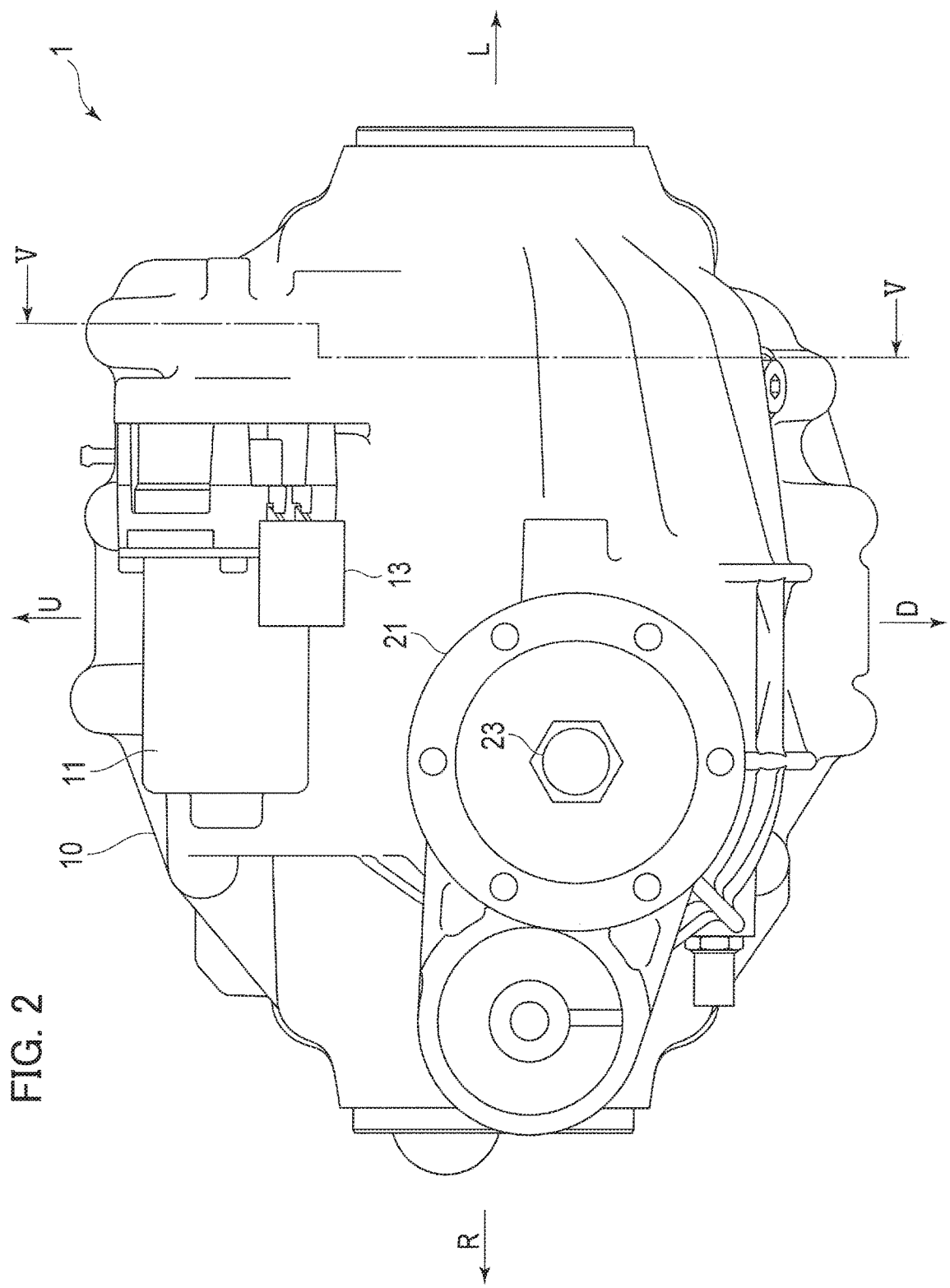
FIG. 2 is an elevational view of the final drive viewed from its front.

Referring mainly to FIGS. 1 and 2, a final drive 1 is mounted on and used in a vehicle for the purpose of differentially distributing torque transmitted from a propeller shaft to a pair of axles. The drive 1 is usually so directed (or oriented) that a companion flange 21 for combining with the propeller shaft faces toward the front F, and the pair of axles are each combined with respective sides thereof. The drive 1 casing 10, in a bottom direction D, faces the road.

The electric motor 11 is disposed outside the casing 10 and in an upper direction U of the casing 10, thereby being hidden from the road behind the casing 10. The electric motor 11 is connected to the electric system of the vehicle via a connector 13.

Figure 3:
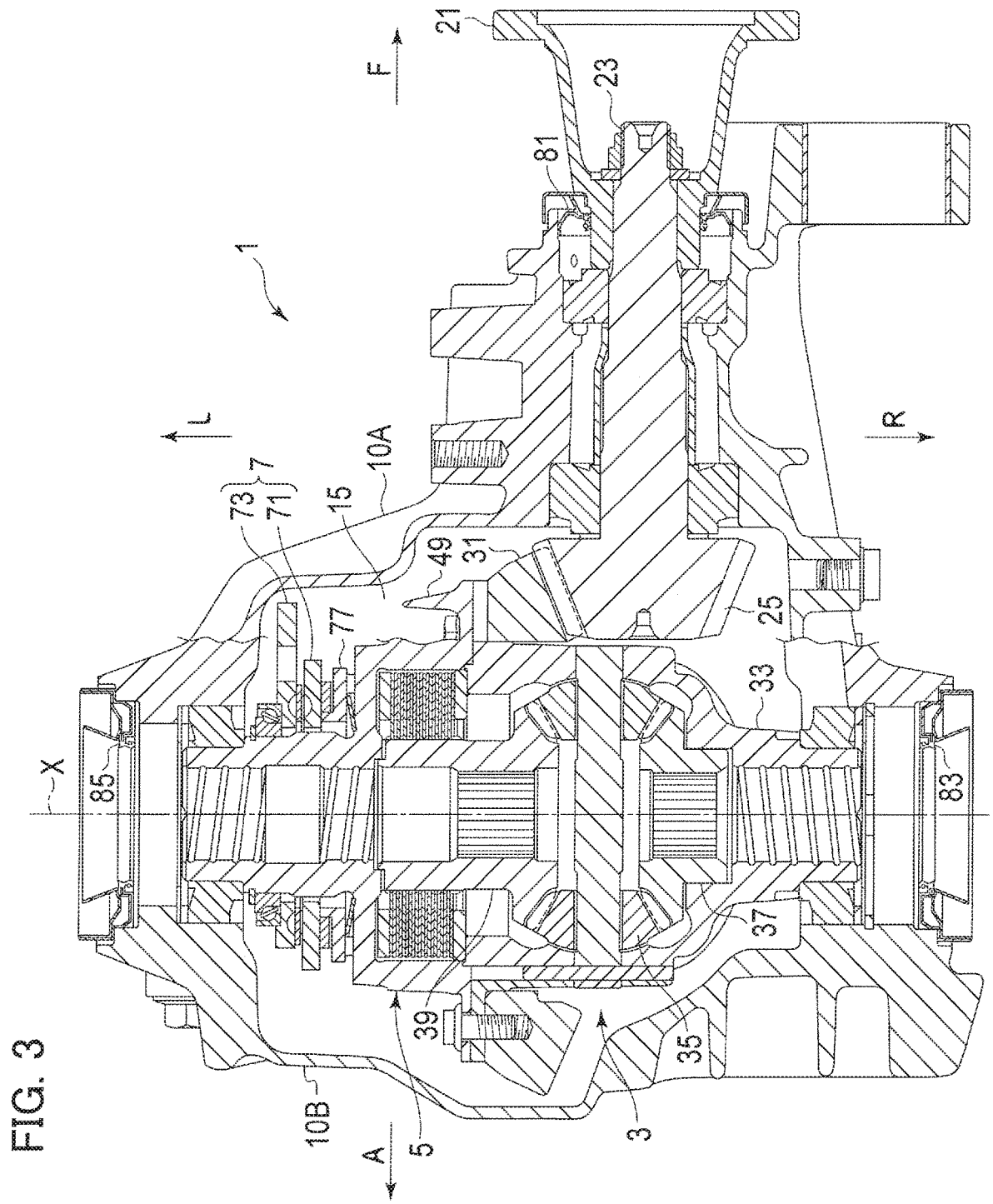
FIG. 3 is a plan sectional view taken from a line of FIG. 1.

Referring mainly to FIGS. 1 and 3, the casing 10 defines a single chamber 15 in its interior, and a differential gear set 3, a clutch 5, a cam mechanism 7 and a reduction gear set 9 to be combined with the electric motor 11 are housed in the chamber 15. For the convenience of incorporation of these elements, the casing 10 is dividable into plural, for example two, sections. In the illustrated example, the casing 10 is, at a plane containing the rotational axis X, dividable into a front piece 10A and a rear piece 10B. Or, although not illustrated, it may have a structure dividable at a plane containing a rotational axis of a pinion gear 25.

The differential gear set 3 is rotatably supported by the casing 10 via bearings, thereby being rotatable about the rotational axis X. The clutch 5 and the cam mechanism 7 are in addition supported coaxially by the differential gear set 3 so that they axially adjoin each other. The pinion gear 25 is also rotatably supported by the casing 10 via bearings but its rotational axis is perpendicular to the rotational axis X in the plan view. The rotational axis X and the rotational axis of the pinion gear 25 may be nevertheless neither on an identical plane nor crossing each other, as best understood from FIG. 1 (specifically, they may be in a skew relationship).

As described already, while the companion flange 21 projects from the casing 10 toward the front F, it is, at its center, coupled with the pinion gear 25 in the casing 10 by means of a nut 23. A seal member 81 liquid-tightly seals a gap between the companion flange 21 and the casing 10.

The differential gear set 3 is a device for differentially distributing the torque to the pair of axles. While the description hereinafter refers an example of a bevel gear type, any other suitable type such as a face-gear type or a planetary gear type is also possible in this context.

The differential gear set 3 is in general comprised of a ring gear 31, a case 33, a plurality of pinion gears 35, and a pair of side gears 37, 39, the whole of which is rotatable about the rotational axis X. The ring gear 31 meshes with the pinion gear 25 to receive the torque and is coupled with the case 33 via bolts or the like to transmit the torque to the case 33. The pinion gear 35 is rotatably coupled with the case 33 and further meshes with the pair of side gears 37, 39, so that the torque input to the case 33 is differentially distributed to the side gears 37, 39.

The respective side gears 37, 39 are coupled with right and left axles to drive wheels. To liquid-tightly seal gaps between the axles and the casing 10, the casing 10 is comprised of seal members 83, 85.

Figure 4:
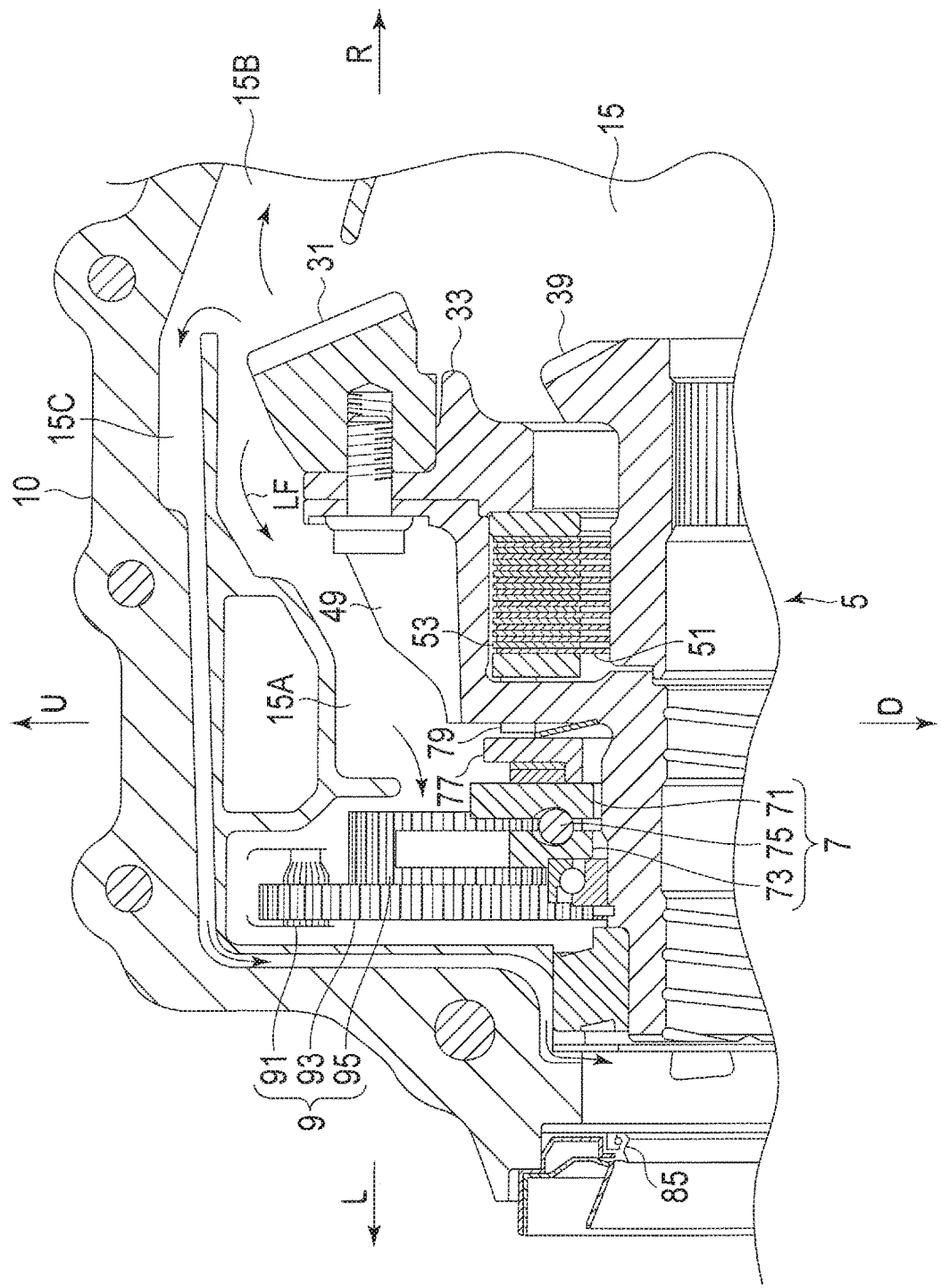
FIG. 4 is a partial sectional view taken from a line IV-IV of FIG. 1, which mainly illustrates a differential gear and a reduction gear.

The clutch 5 is used for the purpose of limiting differential motion of the differential gear set 3. Referring to FIG. 4 in combination with FIG. 3, the clutch 5 is also rotatable about the rotational axis X and is comprised of a plurality of clutch plates 51, 53, and clutch plates 51 and the clutch plates 53 are alternately arranged in a row. The clutch plates 51 are drivingly coupled with the side gear 39 and the clutch plates 53 are drivingly coupled with the case 33. Therefore, when pressure force acts thereon in a direction along the rotational axis X, the clutch plates 51 and the clutch plates 53 frictionally connect with each other so as to brake the side gear 39 relative to the case 33. Specifically, the clutch 5 limits differential motion of the differential gear set 3. For the present embodiment a multi-plate clutch as described herein is adequate, but alternatively a clutch of any proper type such as a cone type could be employed.

To generate the pressure force acting on the clutch 5 in the direction along the rotational axis X, the cam mechanism 7 may be used. The cam mechanism 7 is in general comprised of a cam plate 71 slightly movable along the rotational axis X, and a cam gear 73 immovable along the rotational axis X. The cam plate 71 is fixed from rotation (i.e., from rotating) around the rotational axis X, but the cam gear 73 is rotatable. Either the cam plate 71 or the cam gear 73, or both, may be comprised of grooves elongated in its circumferential direction, bottoms of which moderately slope, and cam balls 75 respectively capable of rolling on the grooves may be interposed therebetween.

When the cam gear 73 rotates about the rotational axis X, the cam balls 75 roll on the grooves and then go up along the sloping bottoms so that the cam gear 73 axially presses the cam plate 71. Specifically, this structure converts rotation of the cam gear 73 into pressure force along the rotational axis X of the cam plate 71. Or, any similar structure may be used. In place of the cam balls 75 for example, rollers or any projections that are included as part of a unitary body of either the cam plate 71 or the cam gear 73 may be used.

In order to transmit the pressure force by the cam plate 71, plungers 77, 79 may be interposed therebetween. The case 33 is comprised of through-windows corresponding to the plungers 79, and the plungers 79 pass through the windows to intrude into the case 33. Any repulsive body such as a spring can be interposed between the case 33 and the plunger 77, for example in a direction urging the cam plate 71 away from the clutch 5.

Figure 5:
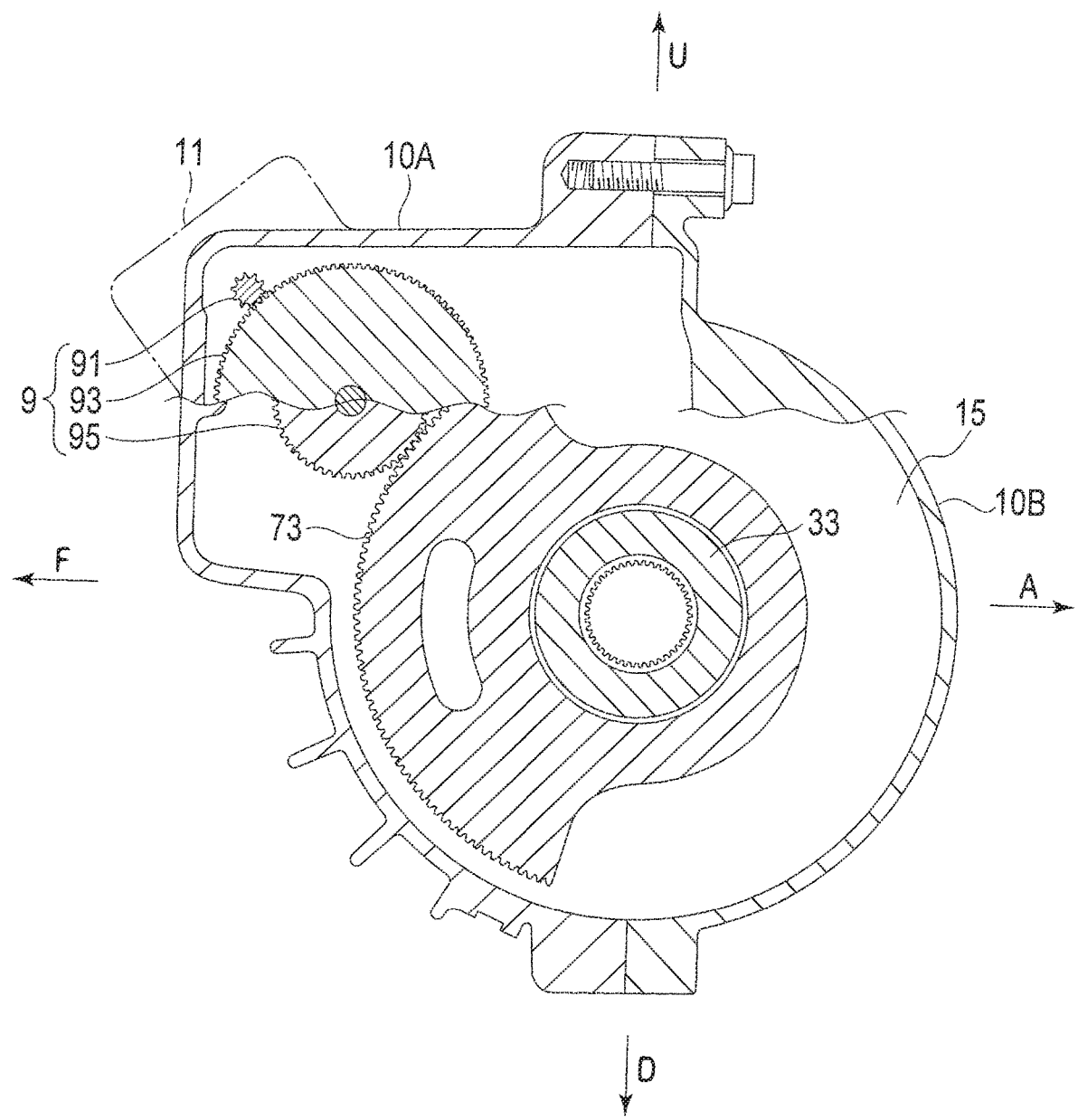
FIG. 5 is a side sectional view taken from a line V-V of FIG. 2, which mainly illustrates the reduction gear.

The reduction gear set 9 is interposed between the electric motor 11 and the cam gear 73, and reduces the speed (multiplies the force) of rotation of the electric motor 11 and transmits it to the cam gear 73. Referring to FIG. 5 in combination with FIGS. 3 and 4, the reduction gear set 9 is a gear train comprised of a pair of, or a greater number of, gears such as a combination of a pinion 91, a gear 93 and an intermediate gear 95. A shaft of the pinion 91 is led out of the case 33 and is there coupled with the electric motor 11. The pinion 91 meshes with the larger-in-diameter gear 93, and the gear 93 and the intermediate gear 95 unitarily rotate, thereby the speed of rotation is twice reduced. The intermediate gear 95 meshes with the cam gear 73.

When the electric motor 11 operates, its rotation is reduced (its force is multiplied) by the reduction gear set 9 to drive the cam gear 73, and this powered rotation is converted by the cam mechanism 7 into the pressure force in the direction along the rotational axis X to press the clutch 5, thereby limiting the differential motion of the differential gear set 3. When the electric motor 11 operates in its reverse direction, the clutch 5 is disconnected and frees the differential gear set 3 so that the torque is differentially transmitted to the pair of axles.

As described already, as the electric motor 11 is disposed outside and in the upper direction U of the casing 10, the reduction gear set 9 is necessarily disposed in the upper direction U in the casing 10 and is usually above the most parts of the differential gear set 3. Therefore, with absence of any means, lubricant oil for lubricating the differential gear set 3 could not sufficiently reach the reduction gear set 9. The final drive 1 is, as described below, comprised of a structure for supplying the lubricant oil to the reduction gear set 9.

Referring mainly to FIG. 4, the chamber 15 includes a passage 15A for the lubricant oil, which is held between the differential gear set 3 and the casing 10. As the wall of the casing 10 spans from the close vicinity of the ring gear 31 to the close vicinity of the reduction gear set 9, the lubricant oil passage 15A stretches from the ring gear 31 to the reduction gear set 9. Specifically, the reduction gear set 9 faces the lubricant oil passage 15A. The lubricant oil passage 15A, or the wall defining the lubricant oil passage 15A, may decline gradually toward the reduction gear set 9 so as to introduce the lubricant oil by the gravity force to the reduction gear set 9.

When the differential gear set 3 rotates, its ring gear 31 in particular splashes the lubricant oil up. To assist the action of splashing the lubricant oil, the case 33 for example may be comprised of an oil dipper 49 having a shape of a fin or a wing. Flow LF of part of the lubricant oil splashed by oil dipper 49 and/or the ring gear 31, as being led by the passage 15A, reaches and lubricates the reduction gear set 9. Another part of the lubricant oil is led by passages 15B, 15C to reach and lubricate bearings or such in the case 33.

According to the example illustrated in FIG. 4, what are directly exposed to the lubricant oil flow are the cam gear 73 and the gears 93, 95, whereas the reduction gear set 9 as a whole could be lubricated because the rotating gear 93 carries the lubricant oil to the pinion 91.

The final drive 1 could be assembled in a way as described below. Specifically, the pinion gear 25 and the reduction gear set 9 are incorporated into the front piece 10A, and the differential gear set 3 is assembled in parallel. The differential gear set 3 along with the bearings is incorporated into the front piece 10A with adjusting engagement between the gears, and thereafter the rear piece 10B is tightened with the front piece 10A by means of bolts or such, then the final drive 1 can be in general completed. The respective sealing members and the companion flange 21 could be thereafter attached thereto. As the shaft of the pinion 91 projects out of the casing 10, the electric motor 11 can be coupled thereto in an easy way, precise positioning is unnecessary. In any steps in the assembly procedure, any elements are left open to easy access and therefore the assembly is quite easy.

According to the present embodiment, all the shafts of the final drive 1 are commonly supported by the casing 10, in particular by the single front piece 10A. Therefore the issue of position adjustment would not occur and nonetheless engagement among the gears is stable. All the gears are housed in the casing 10 and are lubricated by the common lubricant oil. As the casing 10 is liquid-tightly sealed, dust intrusion from the exterior is prevented.

The electric motor 11 is disposed outside, but above, the casing 10. As this position hides the electric motor 11 from the road, it is not exposed to the incoming stones, dirt or water. Its durability is not ill-affected thereby. Of course the electric motor 11 may be formed in a unitary body with, or housed in, the casing 10.

Although certain exemplary embodiments have been described above, modifications and variations of the embodiments described above will occur to those skilled in the art, in light of the above teachings.

INDUSTRIAL APPLICABILITY

A final drive with excellent durability against incoming stones, dirt or water from the road is provided.

The invention claimed is:

1. A final drive mountable on a vehicle to be opposed to a road, the final drive being of use to transmit torque from a propeller shaft to a pair of axles, comprising:
   a differential gear set so structured as to distribute the torque from the propeller shaft to the pair of axles;
   a clutch rotatable about a rotational axis and combined with the differential gear set;
   a cam mechanism comprising a cam plate fixed from rotation about the rotational axis and so disposed as to move along the rotational axis to exert a fastening force on the clutch, and a cam gear rotatable about the rotational axis, the cam mechanism arranged to convert rotation of the cam gear into a pressure force along the rotational axis of the cam plate;
   a gear set meshed with the cam gear to rotate the cam gear;
   a casing defining a single chamber and housing the differential gear set, the clutch, the cam mechanism and the gear set in the single chamber; and
   a motor disposed outside and above the casing so as to hide behind the casing from the road and combined with the gear set to drive the gear set;
   wherein the casing includes a passage extending along a wall of the casing and having an entrance positioned to receive oil splashed by the differential gear set.

2. The final drive of claim 1, wherein the gear set is disposed above the differential gear set and in a face of a second passage defined between the differential gear set and the casing.

3. The final drive of claim 2, wherein the differential gear set comprises an oil dipper for splashing the oil up.

4. The final drive of claim 1, wherein the differential gear set includes a ring gear rotatable about the rotational axis, and the entrance of the passage is positioned radially outward from the ring gear.

5. The final drive of claim 1, wherein the passage is positioned above the differential gear set.

* * * * *